March 28, 1950  J. J. GRIVNA  2,502,216
COLLET CHUCK
Filed Aug. 20, 1948
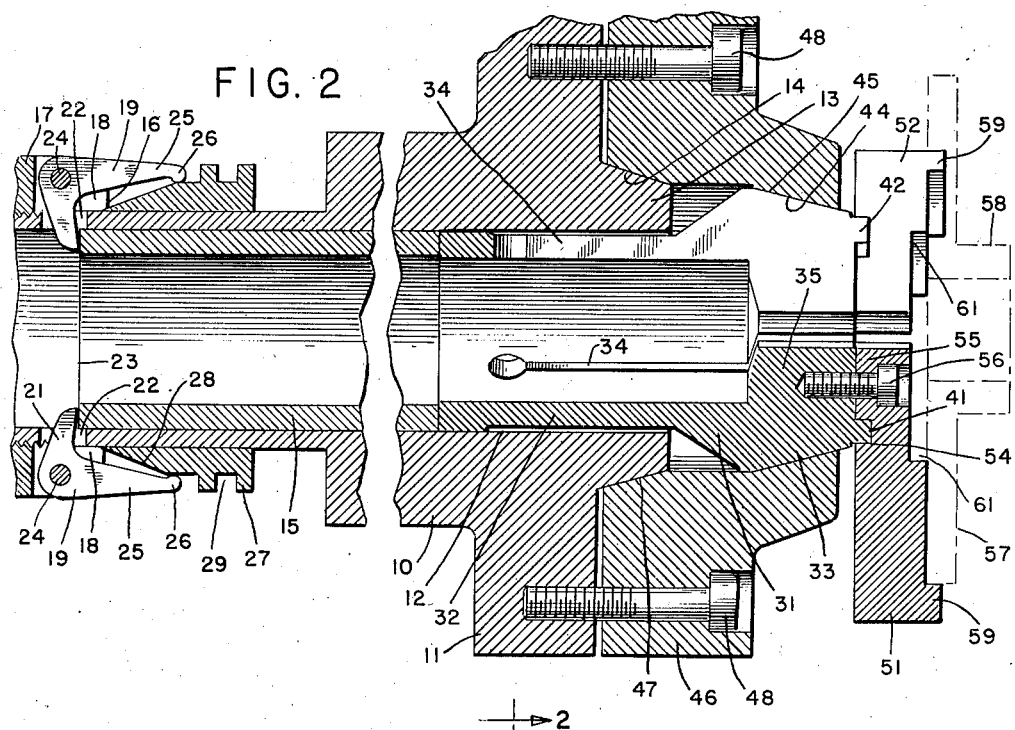
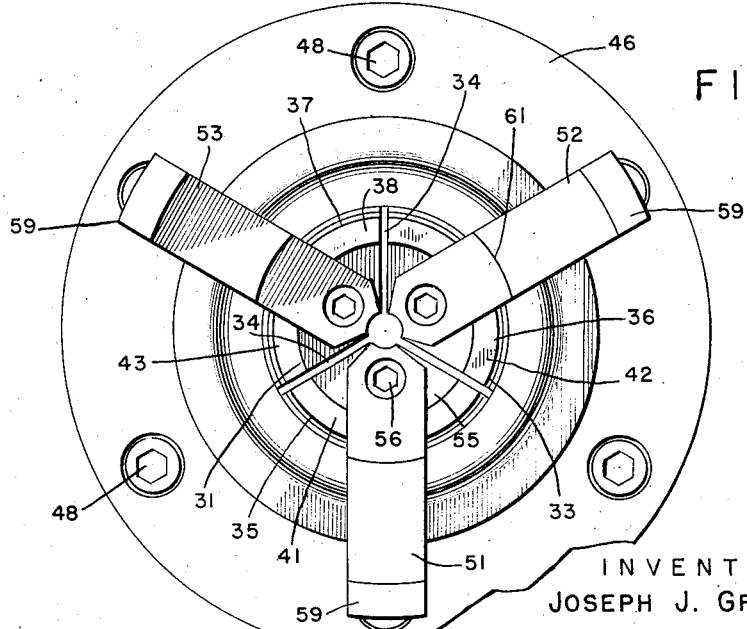
INVENTOR
JOSEPH J. GRIVNA
BY Caswell & Lagaard
ATTORNEYS Patented Mar. 28, 1950

2,502,216

UNITED STATES PATENT OFFICE 2,502,216

COLLET CHUCK

Joseph J. Grivna, Minneapolis, Minn.

Application August 20, 1948, Serial No. 45,291

4 Claims. (Cl. 279—51)

My invention relates to collet chucks and has for an object to provide a construction whereby work other than rods can be quickly and easily mounted in a collet chuck.

An object of my invention resides in utilizing a collet similar to those employed for chucking rods and to which jaws may be applied for holding work other than rods.

Another object of my invention resides in providing a construction whereby jaws of different form and shape may be attached to the same collet.

Another object of my invention resides in providing a construction by means of which the jaws may be quickly and securely attached to the jaw members of the collet.

An object of my invention resides in constructing either the jaws or the collet with a groove, and in providing the other thereof with a tongue received within said groove, said groove and tongue being disposed near the outermost portion of the jaw members of the collet.

Another object of the invention resides in providing a single fastener for securing each jaw to a jaw member of the collet and in disposing said fastener inwardly of the tongue and groove.

A feature of the invention resides in arranging the tongue and groove transversely of the radial medial plane of the jaw member.

An object of the invention resides in constructing the groove and tongue arcuate in form and concentric with the axis of the chuck.

A still further object of the invention resides in utilizing cap screws for securing the jaws to the jaw members of the collet.

Other objects of the invention reside in the novel combination and arrangement of parts and in the details of construction hereinafter illustrated and/or described.

In the drawings:

Fig. 1 is an end elevational view of a turret lathe with a collet chuck embodying my invention applied thereto.

Fig. 2 is a longitudinal elevational sectional view taken on line 2—2 of Fig. 1.

In the mounting of parts in a turret lathe, the collet chuck is one of the most convenient and accurate devices for holding the parts in position. An ordinary collet chuck, however, is only designed for chucking rods and small pieces, and its use is thus very limited. For the purpose of acquiring the benefit of the collet chuck for other types of work, I have embodied in my invention a construction whereby special jaws adapted to receive work other than rods may be quickly and easily attached to the jaw members of a collet chuck.

For the purpose of illustrating the invention, I have shown in the drawings a portion of the spindle 10 of a turret lathe. This spindle has a head 11 at one end thereof and is mounted in suitable bearings in the lathe proper and which have not been shown in the drawings. The spindle 10 and head 11 have a bore 12 extending completely through the same. The head 11 is provided with a ring 13 projecting outwardly therefrom and which is formed with a tapered surface 14. Within the bore 12 is provided a sleeve 15 which is adapted to engage the collet and to operate the same in a manner to be presently described in detail.

An operating mechanism 16 mounted on the end of the spindle 10 serves to reciprocate the sleeve 15 in a direction toward the right as viewed in Fig. 2. This mechanism includes a flange 17 which is mounted on the end of the spindle 10 and which may be secured thereto in any suitable manner. Issuing from the flange 17 are lugs 18. These lugs have pivoted to them levers 19 which have fingers 21 extending inwardly through openings 22 in the spindle 10, and which engage the end 23 of the sleeve 15. The said levers are pivoted to the lugs 18 by means of pintles 24 which pass through said lugs and levers. Levers 19, in addition, include arms 25 which extend along the spindle 10. These arms have cam followers 26 at the ends of the same. Slidable along the spindle 10 is a collar 27 which has a cam 28 adapted to engage the cam followers 26 of the levers 19. A ring for operating the collar 27, not shown in the drawings, is disposed in a groove 29 in the said collar. When the collar 27 is shifted toward the left, fingers 21 are urged against the end 23 of sleeve 15 and said sleeve moved toward the right.

The collet chuck of the invention includes a collet 31 which has a shank 32 extending into the bore 12 of spindle 10. The said collet further has a head 33 extending outwardly beyond the bore of said spindle. The head 33 and the shank 32 are formed with slits 34 which extend completely through the head 33 and partly along the shank 32 to form on the head 33 three jaws 35, 36 and 37. Since the jaws 35, 36 and 37 are all identical in construction, and since the parts applied thereto are likewise identical, only the jaw 35 and the associated parts will be described in detail. The head 33 is turned to form a ring 38 extending circumferentially with reference to the axis of the chuck and at the outer portion of the same. Due to the slits 34, this ring is divided to form three tongues 41, 42 and 43 on the various jaw members 35, 36 and 37 and which are arcuate in form.

The head 33 of the collet 31 is constructed with a conical surface 44. This surface is adapted to be engaged by a similar surface 45 formed in a collar 46. Collar 46 encircles the ring 13 and has a conical surface 47 adapted to engage the surface 14 of said ring. By means of this construction, the collar 46 may be accurately centered with respect to the spindle 10 and the surface 45 brought into concentricity with the axis of the chuck. A number of cap screws 48 extend through the collar 46 and are screwed into the head 11 of the spindle 10. This construction serves to hold the collar rigidly mounted on the spindle.

The invention utilizes three jaws 51, 52 and 53 which are attached to the jaw members 35, 36 and 37. Only the jaw 51 will be described in detail. This jaw is constructed with a groove 54 of such shape and dimensions as to snugly receive the tongue 41 of jaw member 35. The said jaw has a portion 55 which extends inwardly of said groove and through which a cap screw 56 extends. This cap screw is threaded into the jaw member 35 inwardly of the tongue 41. It will be readily comprehended that the jaw 51 may be mounted on the jaw member 35 by merely applying the jaw to said jaw member with the groove 54 in position to receive the tongue 41. Thereafter the screw 56 may be applied and screwed into the jaw member 41.

The particular jaws shown in the instant application for patent are constructed to hold a face plate 57 having a hub 58 thereon. For this purpose each of the jaws 51, 52 and 53 is constructed with a projection 59 adapted to engage the flange of the face plate 57 at the outer periphery thereof. When the collet chuck is closed by manipulation of the operating mechanism 16, the face plate is held rigidly mounted on the lathe spindle 10. While so mounted, the back of the face plate may be finished and also the hub and the end of the same turned up. While the face plate is still mounted, the same may be bored and any other turning operation capable of being performed while the face plate is so held may be carried out. In order that the boring tool may go completely through the work, the jaws 51, 52 and 53 are recessed as indicated at 61.

In the use of the invention, the collet is normally left in the lathe with the collar 46 encircling the head 33 thereof and the operating mechanism 16 adjusted to procure closing of the chuck when the collar 27 is moved to the position shown in Fig. 2. When the chuck is desired for use, proper jaws are applied to the jaw members of the chuck collet and the same attached thereto by the cap screws 56. The collet chuck is then ready for use. In the use of the same, the work is applied to the collet and inserted within the projection 59 and the operating mechanism of the chuck manipulated in the usual manner.

The advantages of my invention are manifest. The same accuracy can be procured in the centering of pieces of work other than rods and the like, as is possible with a collet chuck used on rods. The pieces can be inserted in the chuck quickly, and the chuck closed in almost the same length of time as required for the operation of a collet chuck on rods. The jaws can be quickly and easily removed and other jaws attached to the jaw members of the collet whenever it becomes desirable. A single fastener member is all that is necessary for securing each jaw to the jaw member of the collet. Such fastener or screw is disposed inwardly of the outermost portion of the collet thus permitting of constructing small jaws and of greatly increasing the range of the work adapted to be held thereby. My invention can be constructed at a nominal expense and will not readily get out of order.

Changes in the specific form of my invention, as herein described, may be made within the scope of what is claimed without departing from the spirit of my invention.

Having described my invention, what I claim as new and desire to protect by Letters Patent is:

1. In a collet chuck, a collet having a number of jaw members circumferentially arranged and having end faces disposed at right angles to the axis of the chuck, a shoulder on each of said jaw members projecting away from said faces thereof, said shoulder being disposed toward the outermost portion of the jaw member and extending in a direction transverse to the medial radial plane of said jaw member, a jaw for cooperation with each of said jaw members and having a shoulder engaging the shoulder of said jaw member and a single fastener extending through said jaw and attached to said jaw member, said fastener being disposed radially inwardly of said shoulder.

2. In a collet chuck, a collet having a number of jaw members circumferentially arranged and having end faces disposed at right angles to the axis of the chuck, a jaw mounted on the face of each of said jaw members, each jaw and jaw member having juxtaposed parts, a groove in one of said parts and a tongue on the other of said parts, said tongue being received within said groove and extending in a direction transverse of the radial medial plane of the chuck and a single fastener disposed radially inwardly of said groove, said fastener extending through the jaw and being attached to the jaw member.

2. In a collet chuck, a collet having a number of jaw members circumferentially arranged and having end faces disposed at right angles to the axis of the chuck, a groove in each of said jaw members, a jaw mounted on the face of each of said jaw members and having a part received within said groove, said groove extending in a direction transverse of the radial medial plane of the chuck and a single fastener member disposed radially inwardly of the said groove, said fastener extending through the jaw and being attached to the jaw member.

4. In a collet chuck, a collet having a number of jaw members circumferentially arranged and having end faces disposed at right angles to the axis of the chuck, a jaw mounted on the face of each of said jaw members, each jaw and jaw member having juxtaposed parts, an arcuate groove in one of said parts concentric with the axis of the chuck, a tongue on the other of said parts received within said groove, and a single fastener disposed radially inwardly of said groove and securing said jaw to said jaw member.

JOSEPH J. GRIVNA.

REFERENCES CITED

The following references are of record in the file of this patent:

UNITED STATES PATENTS

| Number | Name | Date |
|---|---|---|
| 685,963 | Allen | Nov. 5, 1901 |
| 968,051 | Hanson | Aug. 23, 1910 |
| 1,265,606 | Busch | May 7, 1918 |